United States Patent [19]
Lee et al.

[11] Patent Number: 5,923,852
[45] Date of Patent: Jul. 13, 1999

[54] METHOD AND SYSTEM FOR FAST DATA TRANSMISSIONS IN A PROCESSING SYSTEM UTILIZING INTERRUPTS

[75] Inventors: Sherman Lee, Rancho Palos Verdes; Ramkrishna Vepa, Fremont; Robert Alan Williams, Cupertino, all of Calif.

[73] Assignee: Advanced Micro Devices, Inc., Sunnyvale, Calif.

[21] Appl. No.: 08/708,308

[22] Filed: Sep. 4, 1996

[51] Int. Cl.$^6$ ...................................................... G06F 17/00

[52] U.S. Cl. ....................................... 395/200.64; 395/876

[58] Field of Search ........................... 395/200.8, 200.64, 395/200.47, 200.48, 200.63, 872, 873, 876, 877; 370/230

[56] References Cited

U.S. PATENT DOCUMENTS

5,440,690   8/1995   Rege et al. ........................... 395/200.8

*Primary Examiner*—Ellis B. Ramirez
*Attorney, Agent, or Firm*—Sawyer & Associates

[57] ABSTRACT

A system and method for facilitates a fast transmission of packet information into the buffers without unnecessary delays, thereby increasing overall system performance. The method and system comprises sending a packet of information located in a local buffer to a media, generating an interrupt signal indicating a completed transfer of the packet to the media and availability of the local buffer for receiving a next packet, and sending the next packet of information from a queue to the local buffer in response to the interrupt signal, wherein the generation of the interrupt signal after each data packet is transmitted to the media does not affect the overall operation of the processing system.

8 Claims, 7 Drawing Sheets

PRIOR ART

FIG. 1

PRIOR ART

PRIOR ART

FIG. 4

PRIOR ART

METHOD AND SYSTEM FOR FAST DATA TRANSMISSIONS IN A PROCESSING SYSTEM UTILIZING INTERRUPTS

FIELD OF THE INVENTION

The present invention relates to a method and system for management of data transmission and more particularly to a method and system for a speedy data transmission using interrupts.

BACKGROUND OF THE INVENTION

In order to run peripheral applications in a processing system, the operating system must be capable of interfacing with a plurality of applications. The operating system typically employs peripheral devices referred to as network controllers to facilitate the interfacing. An interface layer generally exists between the operating system and the peripheral device. The portion of the interface layer dedicated to communication with the peripheral device typically comprises the device driver. The device driver controls and communicates with the network controller or peripheral device. It is a special subroutine written for each peripheral device. The device driver also provides information to the hardware which determines when to transmit packets of information to the peripherals.

A device driver is typically structured in layers. The upper layers of the device driver are generally dedicated to communication with the operating system and network protocols. The lower layers of the device driver are usually dedicated to interfacing with hardware, such as the network controller or other peripheral device. The network controller then sends the information onto a media of some type, for example, a wire or the like. It is important to send such data information onto a media in as efficient manner as possible to enhance the performance thereof.

The basic system for transmitting a packet of information onto a media uses its memory to store packets until the time of transmission. Since the speed of data transfer to the media is very slow compared to the CPU speed, an information transfer bottleneck occurs. This bottleneck causes the system to use much of its memory in storing the data packets. There are two conventional approaches to solving this problem. The first approach is referred to as the double copy approach. The second approach is referred to as the scatter gather approach. Each of these approaches will be discussed below.

In the conventional double-copy approach, a small number of local buffers for holding data packets are received from the main memory of the processing system in a preallocated arrangement. The local buffers then send the packets to the media in a preallocated fashion. When the local buffers are full, any additional packets of information intended to be sent to the media are typically held in a queue within the data processing system to await the availability of one of the local buffers. A timer is generally used to determine whether a local buffer is available by checking the local buffers at the end of a given period, typically about every 10 milliseconds. Since this time period is considerably longer than the time the system takes to transmit a packet from the local buffer to the media, much time is wasted and the system is inefficient.

The second conventional approach, referred to as the scatter-gather approach, utilizes a virtual memory to hold packet information to be transmitted. Although this approach avoids the use of a timer, it still can waste time when the amount of virtual memory needed becomes large. Whenever virtual memory is used, the data processing system must perform a virtual to physical address conversion. As the amount of virtual memory employed increases, the time spent on performing the virtual to physical address conversion increases, and the system becomes correspondingly less efficient.

As can be seen, the above-identified systems waste time and therefore affects the efficiency of the system. It is important in a data processing system to provide as efficient transmission of data as possible. It is also important that an improvement in efficiency should not add significant complexity and expense to such a system. Accordingly, what is needed is a system and method for fast transmission of data information in a data processing system in which the delays inherent in conventional systems are significantly reduced. The present invention addresses such a need.

SUMMARY OF THE INVENTION

The present invention provides a method and system for fast buffer management and fast transmission of data packets in a processing system. The method and system comprises sending a packet of information located in a local buffer to a media, generating an interrupt signal indicating a completed transfer of the packet to the media and availability of the local buffer for receiving a next packet, and sending the next packet of information from a queue to the local buffer in response to the interrupt signal, wherein the generation of the interrupt signal after each data packet is transmitted to the media does not affect the overall operation of the processing system.

According to the system and method disclosed herein, the present invention facilitates a fast transmission of packet information into the buffers without unnecessary delays, thereby increasing overall system performance. By utilizing an interrupt signal, rather than a timer, the present invention significantly increases the speed of the transmission of data packages to a media.

DESCRIPTION OF THE INVENTION

The present invention relates to an improvement in data transmission in a data processing system. The following description is presented to enable one of ordinary skill in the art to make and use the invention. Various modifications to the preferred embodiment will be readily apparent to those skilled in the art. It will also be readily apparent to those skilled in the art that generic principles herein may be applied to other embodiments. Thus, the present invention is not intended to be limited to the embodiment shown but is to be accorded the widest scope consistent with the principles and features described herein.

Figure 1:
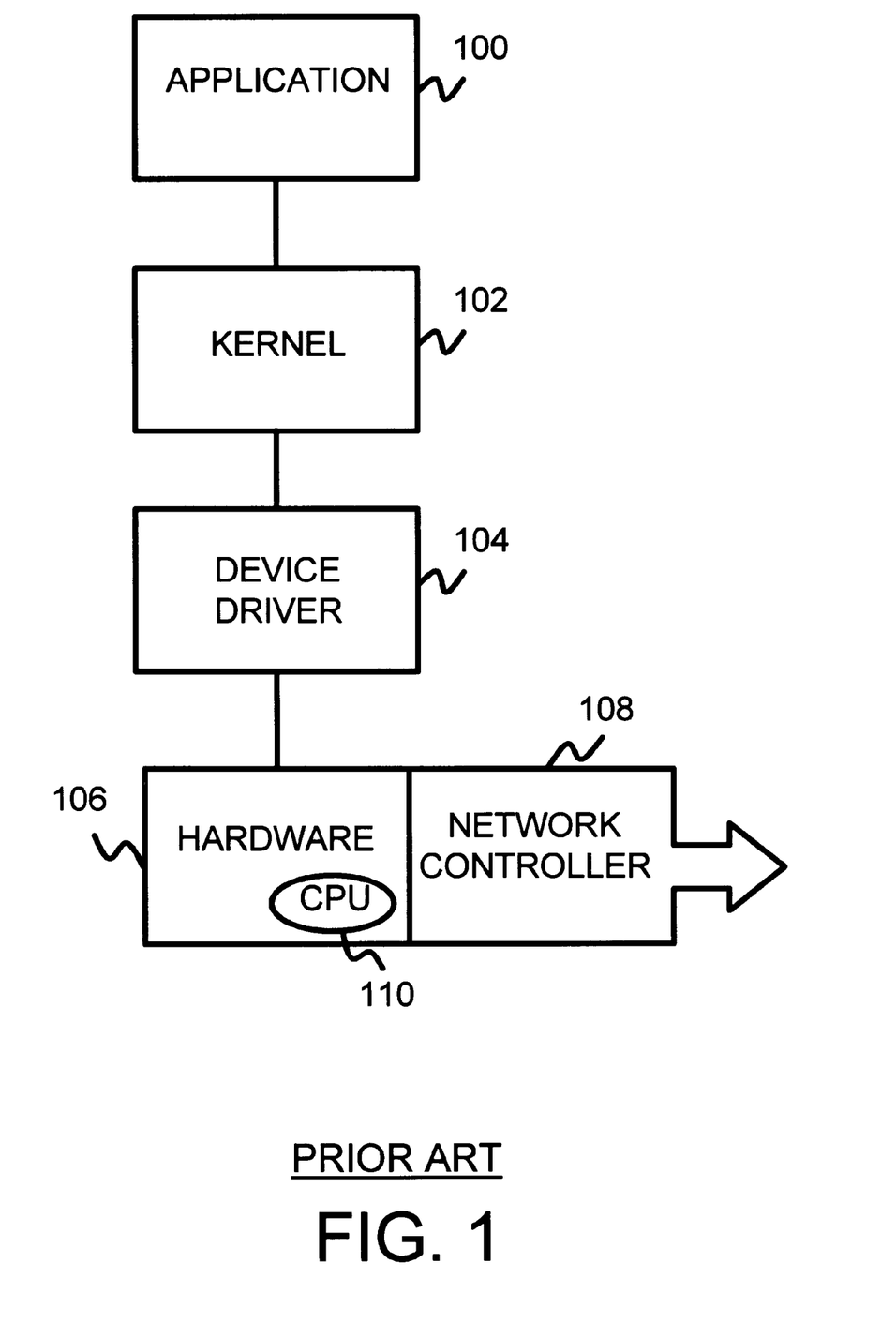
FIG. 1 is a block diagram of the basic information transmission system.

FIG. 1 is a block diagram of a basic data processing system which transmits data packets into the media. The system includes an application 100, a kernel 102, a device driver 104, network controller 108 and central processing unit (CPU) 110 which are part of the hardware 106. A typical CPU 110 utilized in this system is a 586 class CPU manufactured by AMD. This basic system for transmitting data packets onto a media uses its memory to store packets until the time of transmission. Since the speed of data transfer to the media is very slow compared to the CPU 110 speed, an information transfer bottleneck occurs. This bottleneck causes the system to use much of its memory in storing the data packets. The two conventional approaches to solving this problem are the double copy approach and the scatter gather approach.

Figure 2:
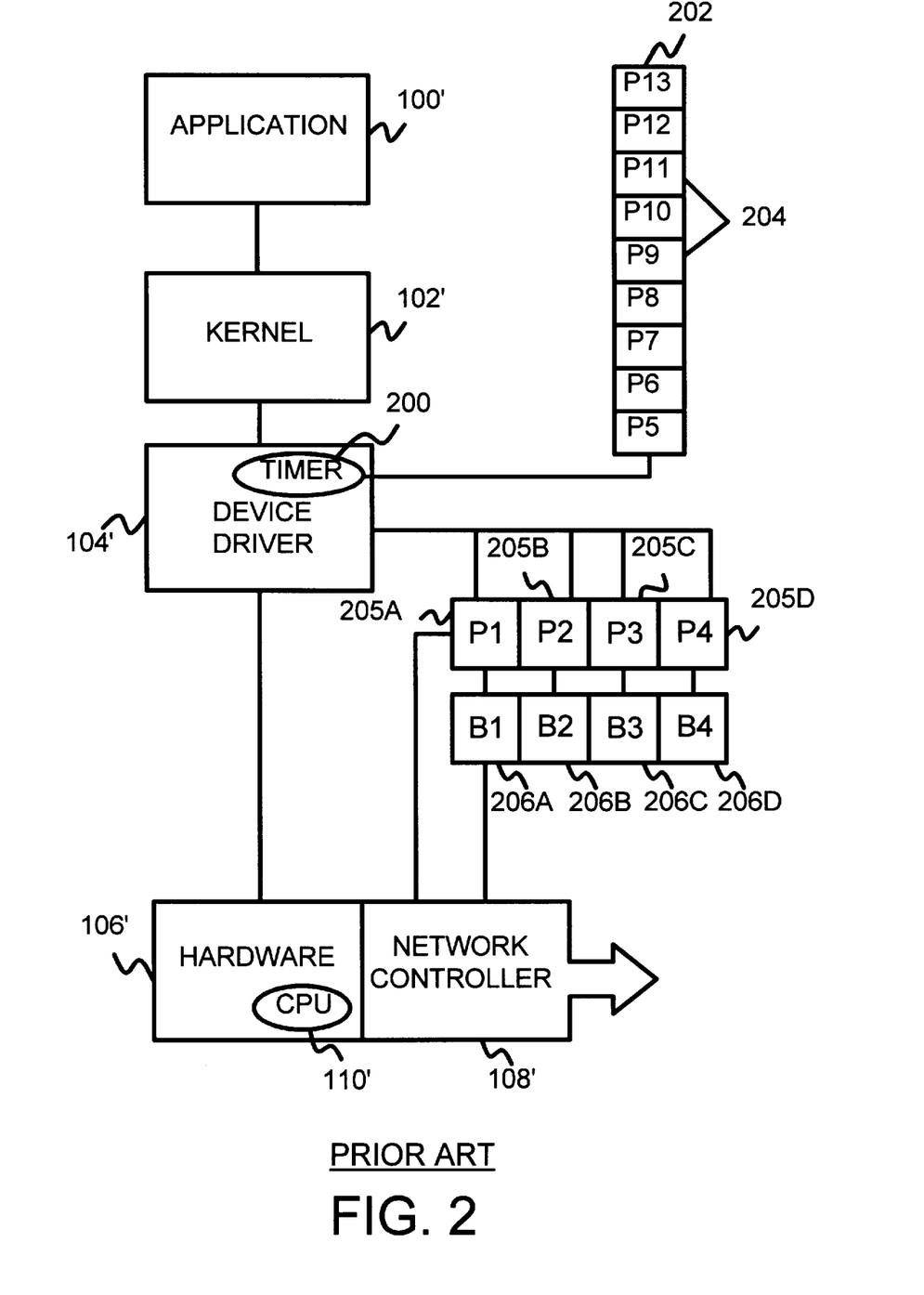
FIG. 2 is a block diagram of a typical prior art approach known as the double copy system.

FIG. 2 is a block diagram of a data processing system which employs a conventional double copy approach. As seen in FIG. 2, the data processing system includes an application 100', a kernel 102', a device driver 104', network controller 108' and central processing unit (CPU) 110' which are part of hardware 106'. The timer 200, a plurality of local buffers 206a–206d and a queue 202 comprise the portion of the double copy approach which solves the earlier problem of requiring too much memory space.

In the conventional double copy approach, a small number of local buffers 206a–206d are preallocated to contain the information describing the packets 204 to be sent to the media. A send routine sends the packet 204 of information to the controller which is typically a network controller 108'. The network controller 108' is a direct memory access (DMA) controller. The network controller 108' performs the DMA from the local data buffers 206a–206d. It has a first-in-first-out (FIFO) which transfers all the data into the media, an example of which is a wire connected to another system.

The DMA controller utilizes descriptors 205a–205d which are link lists of data structure which the device driver 104' and controller share. Each descriptor 205a–205d describes a packet 204 of information. The driver 104 is written so that a packet 204 of information is sent to the send routine and places information in the descriptor 205. The number of descriptors 205a–205d available in the system is determined at initialization time. The number of these predetermined descriptors 205 range from one to one hundred-twenty-eight.

The driver can be designed so that all information pointed to by packet 204 is copied into a local buffer 206. The local buffer 206 is typically the size of the packet 204 on the media which typically has a maximum size of 1518 bytes for Ethernet. Each of the local buffers 206 are pointed to by each descriptor 205. The driver 104 preallocates these local buffers 206 and descriptors 205 initially. For example, the driver 104' may preallocate four local buffers 206a–206d and four descriptors 205a–205d. In an Ethernet environment, the four local buffers 206a–206d will typically use 6K bytes of memory simply to preallocate the local buffers 206 (1518×4). If the predetermined number of descriptors 205 was 128, then 128 local buffers 206a–206d would be needed which would be a large waste of memory. Therefore, the local buffers 206a–206d and descriptors 205 will typically be kept to a minimum.

The packet 204 information is copied into the local buffer 206. Additionally, the local buffer 206 pointer of each packet 204 is in its corresponding descriptor 205. For example, the local buffer 206 pointer of the first packet 204 is in descriptor 205a; the pointer of the second packet 204 is in descriptor 205 b; and so on.

Once all the descriptors 205 have been filled (four in this example), any additional packets 204 are placed in a first-in-first-out (FIFO) queue 202. In this example, all packets 204 other than the first four would be placed in a FIFO queue 202. The size of the FIFO queue 202 is typically unlimited.

An information transfer bottleneck causes the local buffers 206 to remain full. The bottleneck occurs at the point where the data packet 204 is transferred to the wire. If, for example, a 586 class CPU is utilized, the data transfer on the wire can be approximately 10 megabits/sec which is very slow compared to the speed of the 586 class system data bus speeds. So the CPU can deliver the information to the local buffers 206 at a much faster rate than the rate at which the information can exit from the local buffers 206, thus requiring the local buffers 206 to remain as a holding place for the information.

When an additional packet 204 is in the queue 202, the driver uses a timer located in the background of the device driver 104' to determine when to transmit the additional packet 204. The timer 200 periodically checks to see if any of the local buffers 206 are free. The use of a timer 200 is well known in the industry. When the timer 200 determines that a local buffers 206 is free, the packet 204 information waiting in the FIFO queue 202 is then copied into the available data local buffers 206. In this example, the first additional packet 204 would be the fifth packet 204. The timer 200 typically waits for a time no shorter than 10 milliseconds. Approximately every 10 milliseconds, the timer 200 would check if one of the local buffers 206 was available. If one was available, the system would transmit a packet 204 out from the FIFO queue 202 (the fifth packet 204 in this example) to the available buffer 206.

Figure 3:
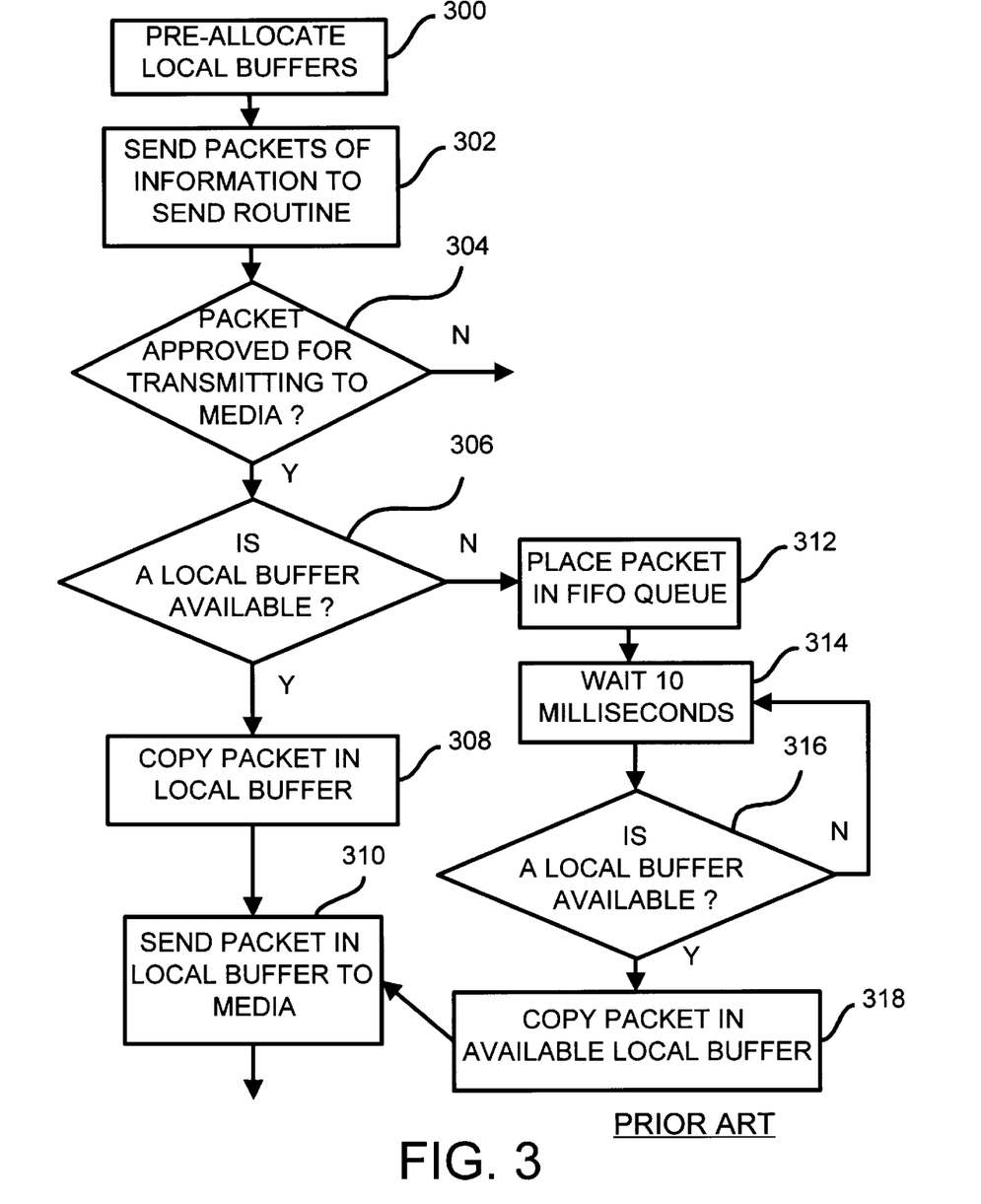
FIG. 3 is a flow chart of a typical double copy system.

FIG. 3 is a flow chart of the operation of the data processing system when utilizing a conventional double copy approach. The procedure for sending information includes step 300, the pre-allocation of local buffers 206. A data packet 204 is sent to a send routine that determines whether a packet 204 is capable of going on the media, as represented by steps 302 and 304. Once the send routine has approved of a packet 204, it checks for an available local buffer 206 in step 306. If an available local buffer 206 exists, the driver copies the data pointed by the packet 204 to the local buffer 206 in step 308. The controller 108' then sends the packet 204 in the local buffer 206 to the media in step 310. If a local buffer 206 is not available, then the packet 204 is placed in a FIFO queue 202 in step 312. It then waits typically 10 milliseconds in step 314, then checks if a local buffer 206 is available in step 316. If one is available, then it copies the packet 204 in the local buffer 206 in step 318. If one is not available, it waits another 10 milliseconds in step 314. The waiting cycle continues until a local buffer 206 is available.

In a typical Ethernet network using a maximum sized data packet 204 of 1514 bytes, it takes about 1 millisecond to transmit the packet. In our example, four maximum sized packets 204 would be transmitted in approximately 4 milliseconds. Since the system waits at least 10 milliseconds before transmitting, but only 4 milliseconds are required for the actual transmission, the minimum time wasted is 6 milliseconds. In a heavily loaded system the timer may initiate after many minutes. If a packet 204 was 128 bytes, it would take approximately 0.1 millisecond to transmit. However, since the system will again wait at least 10 milliseconds prior to transmitting, the minimum wasted time prior to transmitting four packets 24 would be 9.5 milliseconds. Accordingly, as seen, the double copy approach can waste a considerable amount of time which results in inefficiency of the system.

Figure 4:
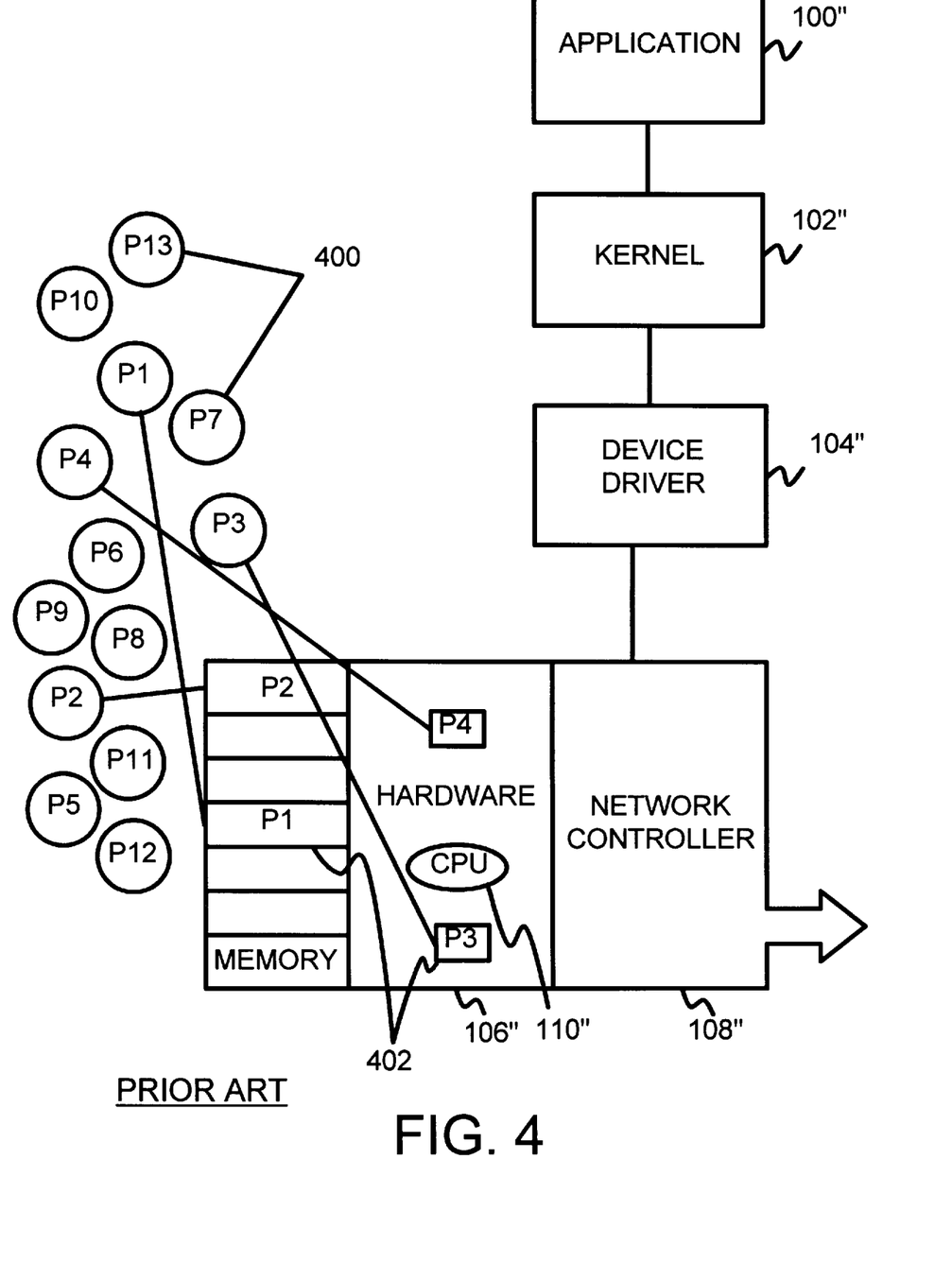
FIG. 4 is a block diagram depicting a typical prior art approach known as the scatter-gather approach.

The second conventional method of information transmission onto a media in a processing environment is the scatter gather approach shown in FIG. 4. The protocol used for the scatter gather approach has different pieces of virtual memory 400 which are not physical memory 402 in the system, but rather, virtual memory 400. The main visible advantages of this scheme is that user programs can be larger than physical memory 402. When a program is setting up to run, the operating system creates a virtual memory 400 space, which is a model of the amount of physical memory 402 and the physical memory 402 addresses the program has at its disposal. A portion of the computer's physical memory 402 is dedicated to the virtual memory 400 process.

A memory mapping feature in the processor makes the physical memory 402 appear to have a working memory address other than its true address. When a program tries to use more virtual memory 400 than the assigned physical memory 402, a special virtual memory 400 support program typically places the program temporarily on hold while it deals with the crisis. The support program can choose some part of the virtual memory 400 currently in local memory 402 and saves its contents temporarily on another memory, for instance, a disk. This process is called swapping out. The memory space which became available is recycled to act as the needed part of virtual memory 400.

When the swapped-out part of information is needed again, it is copied back in from the disk. In this scenario, one does not have to preallocate any local buffers 206 for the actual data transfer onto the media because the system uses virtual memory 400. The network controller 108" performs a direct memory access (DMA) from the protocol buffers to the controller FIFO. Once the network controller 108" performs a DMA directly from the protocol, and the transmission of data to the wire complete, then an interrupt occurs (an interrupt service routine (ISR), then a transmit (TX) complete interrupt), and a send complete can be given to the protocol. Now the protocol knows that this virtual memory 400 is available to use again. It is used to indicate to the protocol that it can use the virtual memory 400 once again. In this environment, there is no local data buffer 206 because the network controller 108" does the DMA directly from the virtual memory 400.

Figure 5:
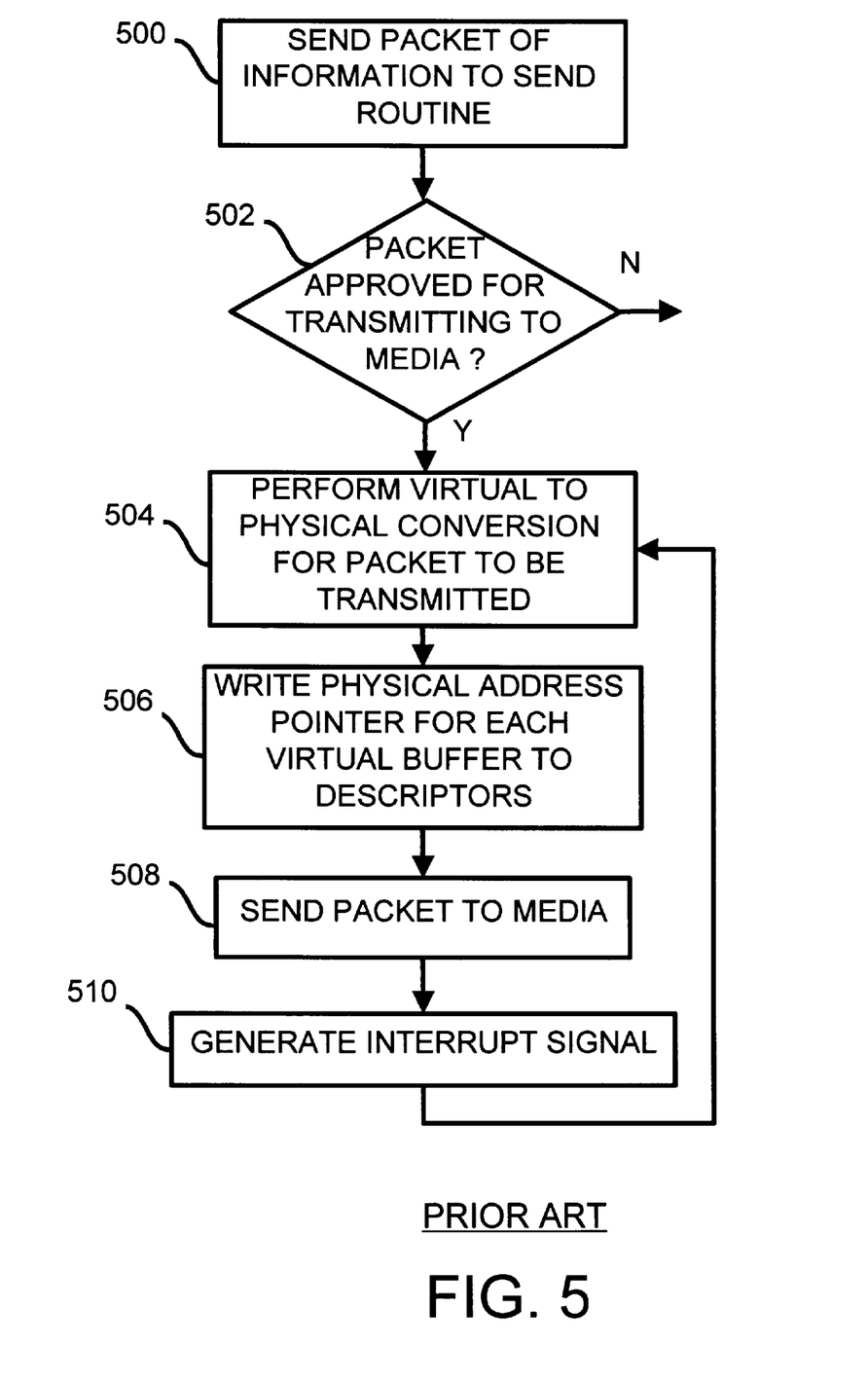
FIG. 5 is a flow chart of a typical scatter-gather approach.

FIG. 5 is a flow diagram of the operation of the scatter-gather approach. The packet of information are sent to the send routine via step 500. The send routine decides if the packet is approved for transmitting to the media via step 502. Each packet in virtual memory 400 must have a virtual to physical memory conversion performed prior to being transmitted to the media via step 504. The physical address pointers are written to the descriptors for each virtual buffer via step 506. The packet is then sent to the media in step 508, and an interrupt signal is generated via step 510 to initiate another virtual to physical memory conversion for the next packet to be transmitted.

In the scatter-gather approach there is no preallocation of the local buffers 206. The problem associated with this method of transferring information is that the system must perform a virtual to physical memory conversion. For every virtual memory 400 used, the system must perform a virtual to physical memory conversion, each conversion taking time. The total amount of time for the conversion becomes greater as the amount of virtual memory 400 used becomes greater. Thus, the greater the number of virtual memory 400, the less efficient the system becomes.

Figure 6:
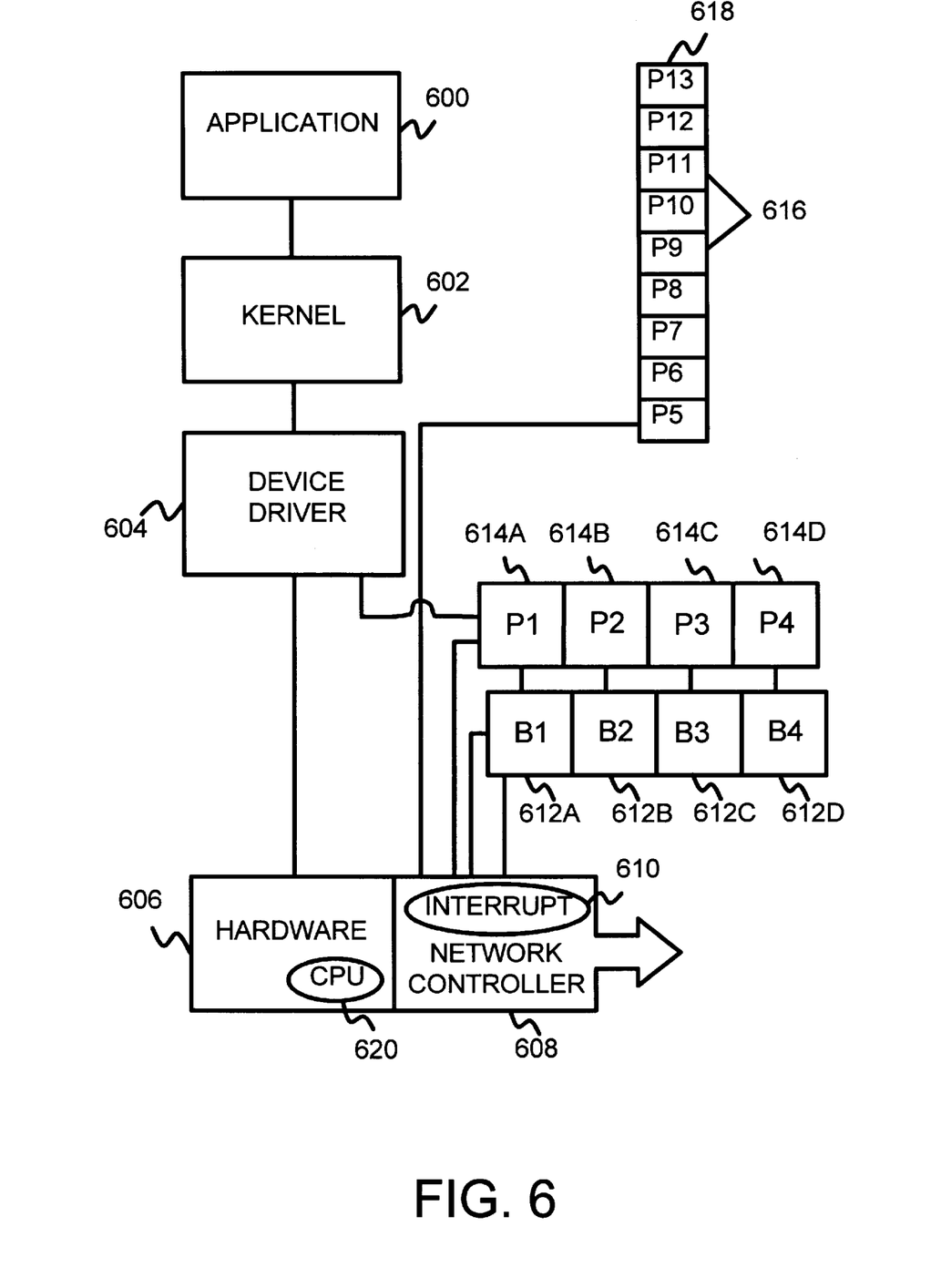
FIG. 6 is a block diagram of an embodiment of a system depicting the invention.
Figure 7:
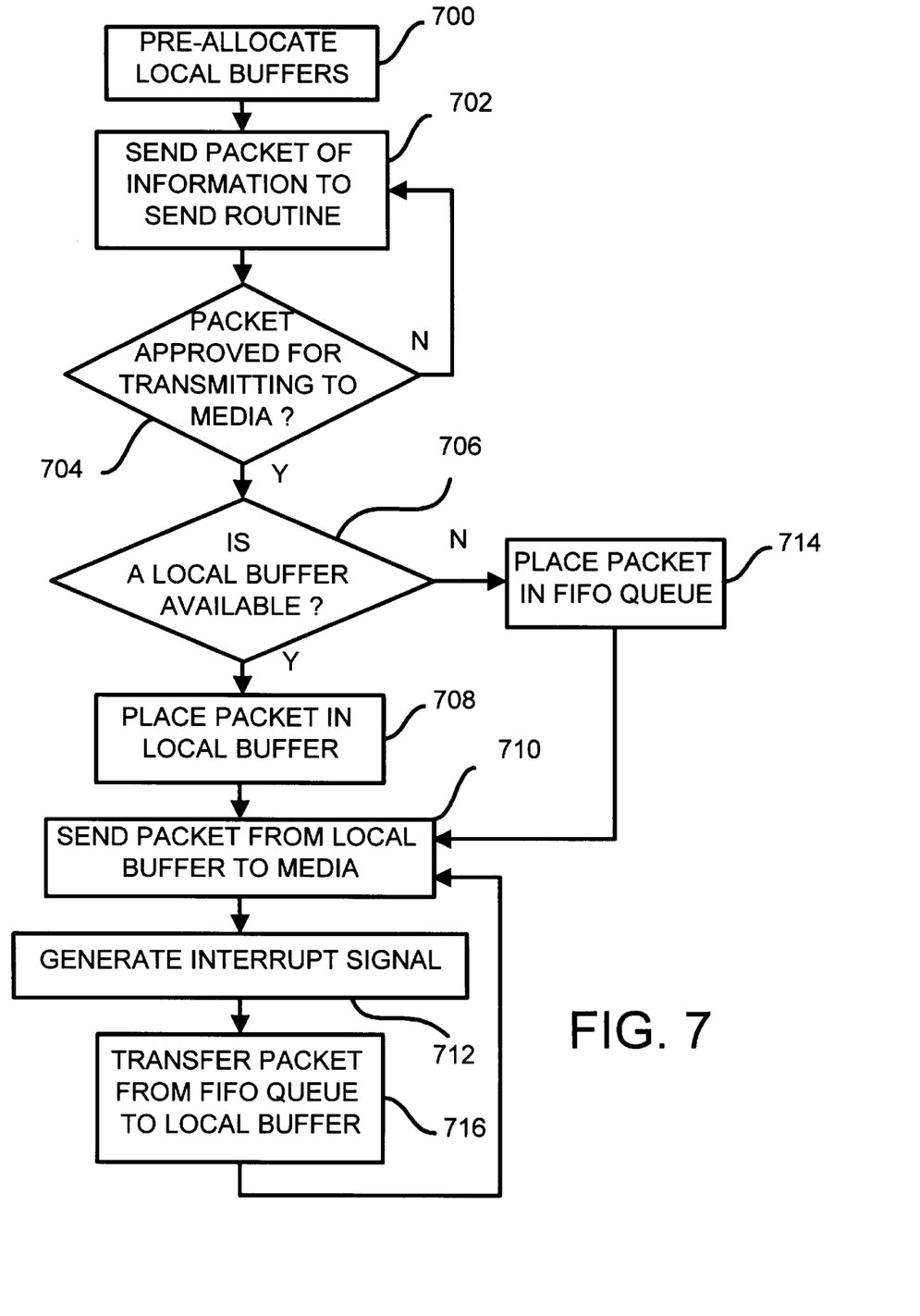
FIG. 7 is a flow chart illustrating the method of the present invention.

FIGS. 6 and 7 illustrate how the present invention provides a new system and method to improve performance of the transmission system for a packet 616 in the FIFO queue 618 waiting for a local buffer 612a–612d to become available. This system utilizes program interrupts 610 to notify the system that a transfer of a packet 616 to the media has been completed and a local buffer 612a–612d has just become available for a new packet 616.

A system in accordance with the present invention avoids the problem of wasted time prevalent in both the standard double copy approach and the scatter-gather approach. A system in accordance with the present invention minimizes the time wasted by eliminating the virtual to physical memory conversion of the scatter-gather approach and it further minimizes the time wasted in periodically checking for the availability of a local buffer.

A system and method in accordance with the present invention utilizes an interrupt that is initiated after completing the transfer of data to the media. Program interrupt 610 refers to the transfer of control from the normal running program to another service program as a result of an internally or externally generated signal. The interrupt 610 scheme is handled by a master program which makes the control transfers. Program interrupts 610 are well known in the field of computer programming and are currently used for various purposes such as indicating errors.

To more particularly illustrate the fast data transfer method and system of the present invention, refer now to FIG. 6 depicting a block diagram of one embodiment of such a system. As seen in FIG. 6, the data processing system includes an application 600, a kernel 602, a device driver 604, and a CPU 620 and a network controller 608 which are part of hardware 606. An example of a network controller 608 which can be incorporated into the present invention is a family of DMA controller chips referred to as PC Net™ controllers manufactured by Advanced Micro Device, Inc. and designed to perform DMA from local buffers 612a–d to the FIFO in the controller. The data processing system operates in conjunction with the local buffers 612a–612d and a queue 618.

As previously discussed, an information transfer bottleneck causes the local buffers 612a–612d to remain full. The bottleneck occurs at the point where the data packet 616 is transferred to media such as the wire. The data transfer on the wire can be approximately 10 megabits/sec which is very slow compared to a 586 class CPU 620 speed of approximately 10 megabits/microseconds. The CPU 620 can deliver the information to the local buffers 612a–612d at a much faster rate than the rate at which the information can exit from the local buffers 612a–612d, thus requiring the local buffers 612a–612d to remain as a holding place for the information. Additionally, the number of local buffers 612a–612d allocated for holding the packet descriptors 614a–614d are typically kept to a minimum for memory conservation purposes. The combination of the information transfer bottleneck and the typically minimum number of local buffers 612a–612d creates a need for an efficient packet 616 transfer system from the FIFO queue 618 to the local buffers 612a–612d.

To further illustrate the method and system of the present invention, refer now to FIG. 7 in conjunction with FIG. 6. FIG. 7 shows a flow diagram of the operation of the present invention. First, the local buffers 612 are pre-allocated at initialization time, via step 700. This preallocation of local buffers 612 avoids the time wasted for every virtual to physical conversion which is necessary in the prior art scatter-gather mechanism. Next, a packet 616 is sent to a send routine, via step 702. Thereafter, a decision is made if the data packet is accurate for transmission to the media, via step 704. If the packet 616 is not accurate, then return to step 702 and send a new packet to the send routine. If the packet 616 is accurate, then it is determined if a local buffer 612 is available, via step 706. If a local buffer is available, then the packet 616 is placed in the local buffer 612, via step 708. The packet 616 is then sent to the media, via step 710. Once a packet 616 is sent to the media, an interrupt 610 signal is generated to indicate the completion of the transmittal, via step 712. If a local buffer 612 is not available, then the packet is placed in a FIFO queue 618 via step 714. When an interrupt 610 signal is generated, then the first packet 616 in the queue 618 is sent to the local buffer 612 via step 716.

CONCLUSION

The system and method of the present invention utilizes an interrupt to indicate that a packet has been sent and the local buffer is now available for the next packet to be transferred from the FIFO queue to the local buffer. Once the data has completed going into the media, network controller provides an interrupt indicating that the transfer has been completed. Since the speed of data transfer to the media is very slow compared to the CPU speed, the generation of interrupts after each packet is sent to the media does not affect the overall operation of the system.

Once the interrupt occurs, the driver can immediately send the next packet waiting in the queue to the local buffer which has become available rather than waiting for a standard period of time, as done in the prior art double copy system. So in the example where four descriptors are predetermined, the fifth packet can go from the FIFO queue, for example, to the newly available local buffer via the interrupt from service routine (ISR) (not shown). The advantage of this method and system is that the packet waiting in the FIFO queue can immediately enter the local buffer as soon as one becomes available. Thus, the lag time in which an available buffer remains empty is greatly minimized.

A method and system has been disclosed for a fast buffer management using interrupt driven events in a heavy traffic system environment. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for fast transmission of data packets in a processing system comprising:

a) sending a data packet located in a local buffer to a media;

b) generating an interrupt signal indicating a completed transfer of the data packet to the media and availability of the local buffer for receiving a next packet; and c) sending the next packet of information from a queue to the local buffer in response to the interrupt signal, wherein the generation of the interrupt signal after each data packet is transmitted to the media does not affect the overall operation of the processing system.

2. The method of claim 1, wherein the first packet of information is direct memory accessed from the local buffer prior to being sent out to the media.

3. A system for fast buffer management in a computer processing system comprising:

a local buffer configured to contain a first packet of information;

a controller configured to send out the packet of information in the local buffer to a media, the controller being also configured to generate an interrupt signal indicating that the transfer of the first packet has been completed and the local buffer is available for receiving a next packet;

a device driver configured to send the next packet of information from a queue to the local buffer in response to the interrupt signal, wherein the generation of the interrupt signal after each data packet is transmitted to the media does not affect the overall operation of the processing system.

4. The system of claim 3, wherein the controller is a direct memory access controller.

5. The system of claim 3, wherein the controller comprises a direct memory access (DMA) controller of a PC net™ device type designed to perform DMA from the local buffer to a first-in-first-out (FIFO) of the controller.

6. The system of claim 3, wherein the queue is a first-in-first-out queue.

7. A computer readable medium containing program instructions for fast transmission of data packets in a processing system, the program instructions for:

a) sending a data packet located in a local buffer to a media;

b) generating an interrupt signal indicating a completed transfer of the data packet to the media and availability of the local buffer for receiving a next packet; and c) sending the next packet of information from a queue to the local buffer in response to the interrupt signal, wherein the generation of the interrupt signal after each data packet is transmitted to the media does not affect the overall operation of the processing system.

8. The computer readable medium of claim 7, wherein the packet of information is direct memory accessed from the local buffer prior to being sent out to the media.

* * * * *